United States Patent
Kim et al.

(10) Patent No.: US 11,920,689 B2
(45) Date of Patent: Mar. 5, 2024

(54) LOOSE TYPE PNEUMATIC VALVE AND LOOSE TYPE PNEUMATIC VALVE MODULE INCLUDING THE SAME

(71) Applicant: SAMSUNG ELECTRONICS CO., LTD., Suwon-si (KR)

(72) Inventors: Jongkyu Kim, Suwon-si (KR); Kwangjun Kim, Ansan-si (KR); Beomsoo Hwang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/572,816

(22) Filed: Jan. 11, 2022

(65) Prior Publication Data

US 2023/0220924 A1 Jul. 13, 2023

(51) Int. Cl.
*F16K 31/44* (2006.01)
*F16K 27/02* (2006.01)

(52) U.S. Cl.
CPC .............. *F16K 27/02* (2013.01); *F16K 31/44* (2013.01)

(58) Field of Classification Search
CPC ........ F16K 27/02; F16K 31/44; F16K 31/485; F16K 31/528; F15B 11/06
USPC ............................................ 137/15.18, 15.19
See application file for complete search history.

(56) References Cited

U.S. PATENT DOCUMENTS

| | | | |
|---|---|---|---|
| 1,925,392 A * | 9/1933 | Harry | F16K 27/02 137/454.2 |
| 3,344,683 A * | 10/1967 | Cerow, Jr. | F16K 31/44 74/526 |
| 4,739,788 A * | 4/1988 | Reback | F16K 31/60 137/315.15 |
| 5,240,030 A * | 8/1993 | Wang | F16K 31/055 137/269 |
| 5,564,461 A * | 10/1996 | Raymond, Jr. | F16K 1/221 403/337 |
| 6,050,541 A | 4/2000 | Chatufale | |
| 6,457,484 B1 * | 10/2002 | Najmolhoda | F16K 31/082 335/262 |
| 6,599,116 B2 | 7/2003 | Lee et al. | |
| 6,742,765 B2 * | 6/2004 | Takano | F16K 31/047 251/292 |
| 6,848,672 B2 * | 2/2005 | Cross | F16K 31/055 285/921 |
| 6,880,806 B2 * | 4/2005 | Haikawa | F16K 31/041 251/305 |
| 9,322,488 B2 | 4/2016 | Imai et al. | |
| 9,964,226 B2 * | 5/2018 | Scaramucci | F16K 27/067 |
| 10,054,166 B2 * | 8/2018 | Bakken | F16D 1/10 |

(Continued)

FOREIGN PATENT DOCUMENTS

| | | |
|---|---|---|
| JP | H 11-294420 A | 10/1999 |
| JP | 2005-172154 A | 6/2005 |

(Continued)

*Primary Examiner* — Umashankar Venkatesan
(74) *Attorney, Agent, or Firm* — Fish & Richardson P.C.

(57) ABSTRACT

A loose type pneumatic valve and a loose type pneumatic valve module, the loose type pneumatic valve including a valve body including a pneumatic passage therein; a valve head on the valve body, the valve head being coupleable with an actuator; a stem on the valve head, the stem being configured to open and close the pneumatic passage; and at least one alignment socket on the valve head, the at least one alignment socket being configured to align the valve head with the actuator.

7 Claims, 5 Drawing Sheets

(56) References Cited

U.S. PATENT DOCUMENTS

| | | | | |
|---|---|---|---|---|
| 10,279,679 | B2* | 5/2019 | Wada | F02M 37/00 |
| 10,323,765 | B2* | 6/2019 | Scaramucci | F16K 31/055 |
| 10,464,742 | B2 | 11/2019 | Tiffany, III | |
| 10,697,559 | B2 | 6/2020 | Yoon | |
| 10,914,397 | B2* | 2/2021 | Frey | F16K 27/08 |
| 11,112,025 | B2* | 9/2021 | Bartow | F16K 7/17 |
| 2002/0158222 | A1* | 10/2002 | Johnson | F16K 7/126 |
| | | | | 251/291 |
| 2014/0224353 | A1* | 8/2014 | Strebe | F16K 31/04 |
| | | | | 137/343 |
| 2018/0094733 | A1 | 4/2018 | Clement et al. | |
| 2018/0224013 | A1* | 8/2018 | Seres | F16K 27/02 |
| 2021/0283731 | A1 | 9/2021 | Bexold et al. | |

FOREIGN PATENT DOCUMENTS

| | | |
|---|---|---|
| JP | 5296743 B2 | 9/2013 |
| JP | 5976346 B2 | 8/2016 |
| JP | 5986450 B2 | 9/2016 |
| KR | 10-2003-0090627 A | 11/2003 |
| KR | 10-2011-0113560 A | 10/2011 |
| KR | 10-2018-0086412 A | 7/2018 |
| KR | 10-1926708 B1 | 12/2018 |

* cited by examiner

LOOSE TYPE PNEUMATIC VALVE AND LOOSE TYPE PNEUMATIC VALVE MODULE INCLUDING THE SAME

STATEMENT REGARDING PRIOR DISCLOSURE BY THE INVENTOR OR A JOINT INVENTOR UNDER 37 C.F.R. § 1.77(b)(6)

The inventors of the instant application disclosed the subject matter of the instant application in Korean Application No. 10-2019-0172965, which was filed on Dec. 23, 2019, and was published as Korean Publication No. 10-2021-0017980, on Feb. 17, 2021. Korean Publication No. 10-2021-00179 is listed on a concurrently filed Information Disclosure Statement.

BACKGROUND

1. Field

Embodiments relate to a loose type pneumatic valve and a loose type pneumatic valve module including the same.

2. Description of the Related Art

A loose type pneumatic valve may be operated by an actuator. The actuator may pull a stem of the loose type pneumatic valve to supply a gas through a pneumatic passage in the loose type pneumatic valve.

SUMMARY

The embodiments may be realized by providing a loose type pneumatic valve including a valve body including a pneumatic passage therein; a valve head on the valve body, the valve head being coupleable with an actuator; a stem on the valve head, the stem being configured to open and close the pneumatic passage; and at least one alignment socket on the valve head, the at least one alignment socket being configured to align the valve head with the actuator.

The embodiments may be realized by providing a loose type pneumatic valve module including a loose type pneumatic valve including a valve body including a pneumatic passage, a valve head on the valve body, a stem on the valve head, the stem being configured to open and close the pneumatic passage, and at least one alignment socket on the valve head; and an actuator including an actuator body coupled with the valve head, a stem gripper on the actuator body, the stem gripper being configured to grip the stem, and at least one alignment socket pin on the actuator body, the at least one alignment socket pin being inserted into the at least one alignment socket.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
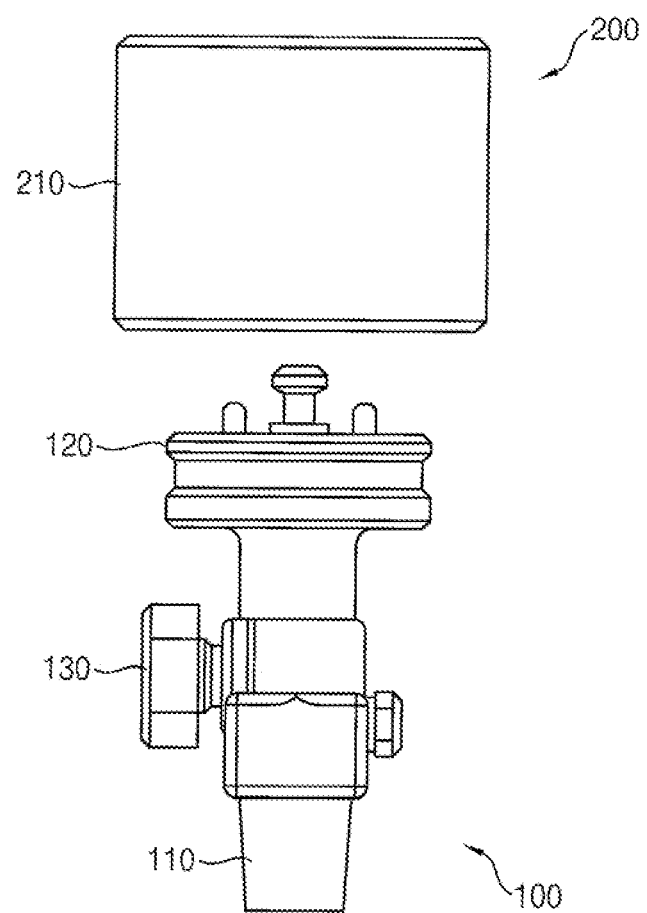
FIG. 1 is a front view of a loose type pneumatic valve module in accordance with example embodiments.

FIG. 1 is a front view of a loose type pneumatic valve module in accordance with example embodiments.

Referring to FIG. 1, a loose type pneumatic valve module of example embodiments may include a loose type pneumatic valve 100 and an actuator 200. The loose type pneumatic valve module may be a separable pneumatic valve module, in which a valve head and an actuator may be coupled and decoupled from each other, e.g., using a clamping mechanism.

The actuator 200 may be selectively combined with (e.g., detachably coupled to) the loose type pneumatic valve 100. In an implementation, the actuator 200 may be selectively combined with an end (e.g., an upper end) of the loose type pneumatic valve 100.

Figure 2:
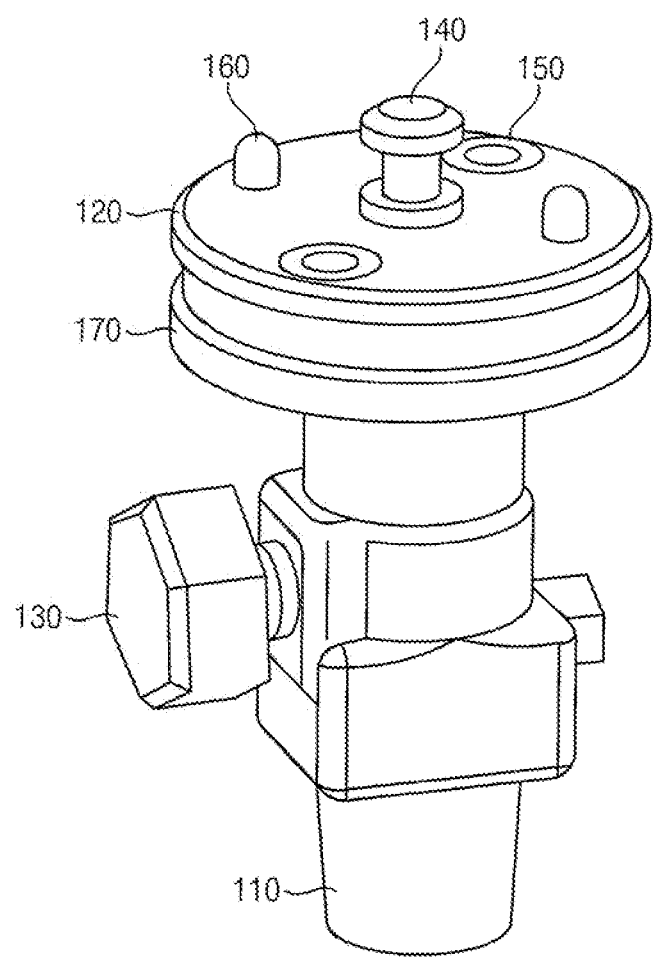
FIG. 2 is a perspective view of a loose type pneumatic valve of the loose type pneumatic valve module of FIG. 1.

FIG. 2 is a perspective view of a loose type pneumatic valve of the loose type pneumatic valve module of FIG. 1.

Referring to FIG. 2, the loose type pneumatic valve 100 may include a valve body 110, a valve head 120, a knob 130, a stem 140, at least one alignment socket 150, at least one position-fixing pin 160, and a cam clamp groove 170.

The valve body 110 may have a (e.g., hollow) cylindrical shape. The valve body 110 may include a pneumatic passage through which a pneumatic fluid may flow. The pneumatic passage may be in the valve body 110.

The valve head 120 may be at an upper end of the valve body 110. The valve head 120 may be selectively combined with the actuator 200. The valve head 120 may include a pneumatic line connected to the pneumatic passage.

The knob 130 may be installed at an outer circumferential surface or side of the valve body 110. In an implementation, the knob 130 may fix the valve body 110 to a fixture, e.g., a combining apparatus.

The stem 140 may be installed at or on a surface of the valve head 120. The surface of the valve head 120 may be oriented toward (e.g., may face) the actuator 200 (e.g., when the loose type pneumatic valve 100 is to be coupled with the actuator 200). In an implementation, the surface of the valve head 120 may correspond to an upper surface of the valve head 120. The stem 140 may be arranged on or at a central portion of the upper surface of the valve head 120. In an implementation, the stem 140 may be movably connected to or on the upper surface of the valve head 120 along a vertical direction. In an implementation, the stem 140 may be vertically moved, and the pneumatic line of the valve head 120 and the pneumatic passage of the valve body 110 may be selectively opened and closed.

The alignment socket 150 may be arranged at, on, or adjacent to an edge portion of the upper surface of the valve head 120. The alignment socket 150 may be configured to align the valve head 120 with the actuator 200. In an implementation, the alignment socket 150 may include a pair of alignment sockets 150 spaced apart from each other by a uniform gap.

The position-fixing pin 160 may be arranged at, on, or adjacent to the edge portion of the upper surface of the valve head 120. The position-fixing pin 160 may protrude toward the actuator 200 (e.g., when the loose type pneumatic valve 100 is to be coupled with the actuator 200). The position-fixing pin 160 may be resiliently supported by a resilient (e.g., elastic) member on the upper surface of the valve head 120 (e.g., a spring) that is elastically biased toward the actuator 200 (e.g., when the loose type pneumatic valve 100 is to be coupled with the actuator 200). In an implementation, the position-fixing pin 160 may include a pair of position-fixing pins 160 spaced apart from each other by a uniform gap.

The cam clamp groove 170 may be at or on the outer circumferential surface of the valve head 120. The cam clamp groove 170 may be oriented toward or around the central portion of the valve head 120. The actuator 200 may be rotatably combined with the cam clamp groove 170.

Figure 3:
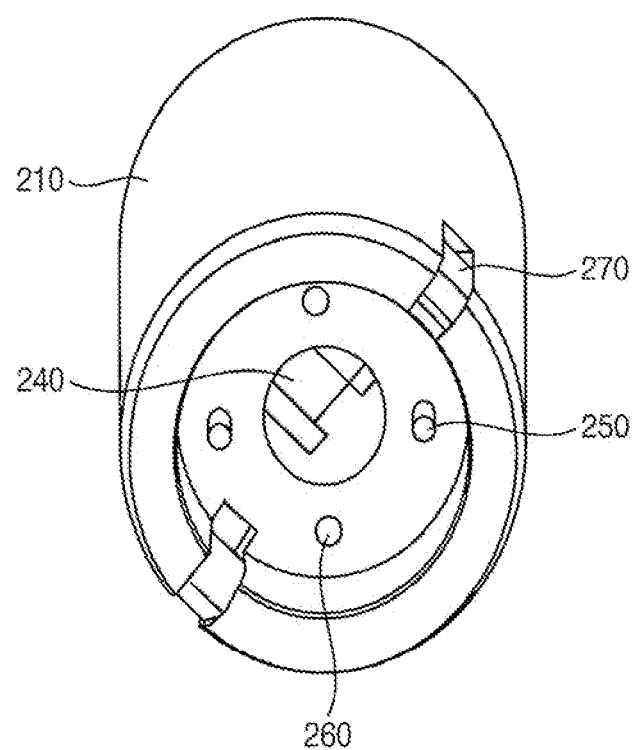
FIG. 3 is a perspective view of an actuator of the loose type pneumatic valve module of FIG. 1.

FIG. 3 is a perspective view of an actuator of the loose type pneumatic valve module of FIG. 1.

Referring to FIG. 3, the actuator 200 may include an actuator body 210, a stem gripper 240, an alignment socket pin 250, a position-fixing hole 260, and a cam clamp 270.

The actuator body 210 may have a cylindrical shape. The actuator body 210 may have a diameter greater than a diameter of the valve head 120. In an implementation, an (e.g., outer) edge portion of a lower surface of the actuator body 210, which may be combined with the upper surface of the valve head 120, may be downwardly exposed (e.g., around the valve head 120).

The stem gripper 240 may be at a central portion of the lower surface of the actuator body 210 oriented toward or facing the pneumatic valve 100, e.g., the upper surface of the valve head 120 (e.g., when the loose type pneumatic valve 100 is to be coupled with the actuator 200). A receiving groove configured to receive the stem 140 of the loose type pneumatic valve 100 may be at a central portion of the lower surface of the actuator body 210. The stem gripper 240 may be in the receiving groove and may be configured to upwardly draw or pull the stem 140. When the stem gripper 240 upwardly draws the stem 140, the pneumatic passage of the loose type pneumatic valve 100 may be opened.

The alignment socket pin 250 may be arranged at or adjacent to the edge portion of the lower surface of the actuator body 210. The alignment socket pin 250 may be selectively inserted into the alignment socket 150 of the loose type pneumatic valve 100 to accurately align the loose type pneumatic valve 100 with the actuator 200, e.g., when the loose type pneumatic valve 100 is coupled with the actuator 200. In an implementation, the alignment socket 150 may include the pair of alignment sockets 150 spaced apart from each other by the uniform gap, and the alignment socket pin 250 may also include a pair of alignment socket pins 250 spaced apart from each other by the uniform gap, e.g., such that the alignment socket pins 250 may be aligned with the alignment sockets 150 to facilitate coupling of the actuator 200 and the loose type pneumatic valve 100.

The position-fixing hole 260 may be at or adjacent to the edge portion of the lower surface of the actuator body 210. The position-fixing pin 160 of the loose type pneumatic valve 100 may be selectively inserted into the position-fixing hole 260 to determine or maintain a combination position between the loose type pneumatic valve 100 and the actuator 200. In an implementation, the position-fixing pin 160 may include the pair of the position-fixing pins 160 spaced apart from each other by the uniform gap, and the position-fixing hole 260 may also include a pair of position-fixing holes 260 spaced apart from each other by the uniform gap, e.g., such that the position-fixing holes 260 may be aligned with the position-fixing pins 160 to facilitate coupling of the actuator 200 and the loose type pneumatic valve 100.

The cam clamp 270 may be rotatably connected to the downwardly exposed edge portion of the lower surface of the actuator body 210. In an implementation, the cam clamp 270 may be resiliently supported (e.g., elastically biased) toward the central portion of the actuator body 210. In an implementation, the actuator body 210 may be rotationally jointed or coupled to the valve head 120, and the cam clamp 270 may enter into the cam clamp groove 170.

Figure 4:
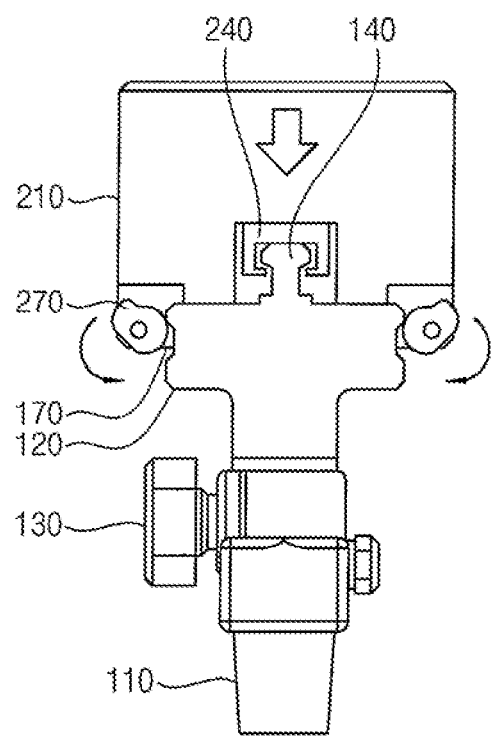
FIGS. 4 and 5 are sectional views of operations of the loose type pneumatic valve module of FIG. 1.
Figure 5:
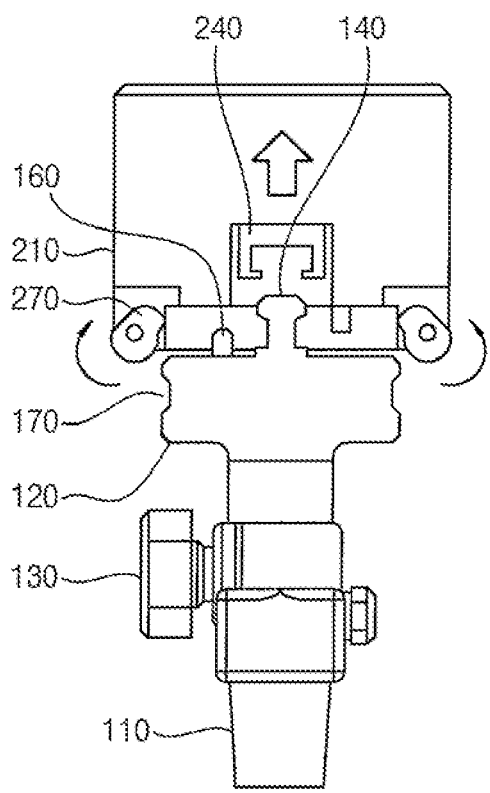

FIGS. 4 and 5 are plan views of operations of the loose type pneumatic valve module of FIG. 1.

Referring to FIG. 4, the cam clamp 270 may be rotated onto or into the cam clamp groove 170 so that the actuator body 210 may be combined or coupled with the valve head 120.

In an implementation, the alignment socket pin 250 of the actuator 200 may be inserted into the alignment socket 150 of the loose type pneumatic valve 100 to accurately align the actuator 200 with the loose type pneumatic valve 100. The position-fixing pin 160 of the loose type pneumatic valve 100 (e.g., downwardly pressed by the rotated actuator body 210) may be inserted into the position-fixing hole 260 of the actuator 200 to fix the actuator 200 with respect to the loose type pneumatic valve 100.

In an implementation, the stem gripper 240 may upwardly draw the stem 140, and the pneumatic passage of the loose type pneumatic valve 100 may then be selectively or controllably opened so that the pneumatic pressure may be applied through the opened pneumatic passage, as desired.

Referring to FIG. 5, after completing the applying of the pneumatic pressure, the cam clamp 270 may be rotated from, off, or out of the cam clamp groove 170 so that the actuator body 210 may be separated from the valve head 120.

In an implementation, the alignment socket pin 250 of the actuator 200 may be released from the alignment socket 150 of the loose type pneumatic valve 100. The position-fixing pin 160 of the loose type pneumatic valve 100 may also be released from the position-fixing hole 260 of the actuator 200.

In an implementation, the stem gripper 240 may release its grip on the stem 140, and the pneumatic passage of the loose type pneumatic valve 100 may then be closed.

Figure 6:
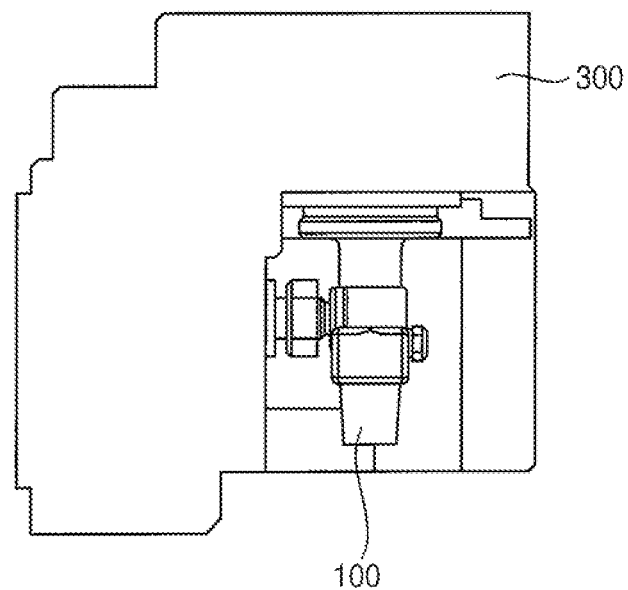
FIGS. 6 and 7 are a side view and a perspective view of the loose type pneumatic valve module of FIG. 1 applied to a combining apparatus.
Figure 7:
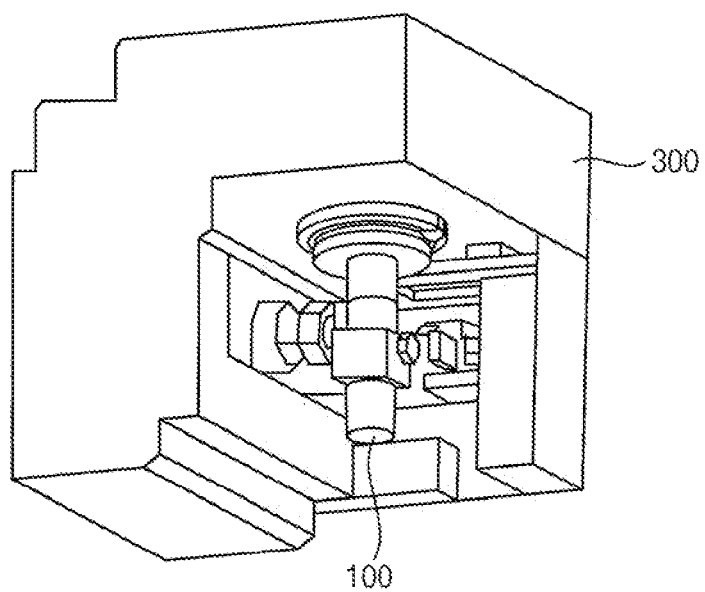

FIGS. 6 and 7 are a side view and a perspective view of the loose type pneumatic valve module of FIG. 1 applied to a combining apparatus.

Referring to FIGS. 6 and 7, the loose type pneumatic valve 100 of the loose type pneumatic valve module may be applied to a combining apparatus 300.

By way of summation and review, an actuator may be manually combined with a loose type pneumatic valve. It may be difficult to automate processes related to the gas supply.

One or more embodiments may provide a loose type pneumatic valve that may be used for readily automating processes related to a gas supply.

According to example embodiments, the alignment socket pin of the actuator may be inserted into the alignment socket of the pneumatic valve to automatically align the actuator with the loose type pneumatic valve. Thus, processes related to a gas supply may be easily automated.

One or more embodiments may provide a pneumatic valve loosenable or detachable from an actuator and a loose type pneumatic valve module including the pneumatic valve.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A loose type pneumatic valve, comprising:
   a valve body including a pneumatic passage therein;
   a valve head on the valve body, the valve head being coupable with an actuator;
   a stem on the valve head, the stem being configured to open and close the pneumatic passage;
   a stem gripper on the actuator body, the stem gripper being located at a central portion of a lower surface of the actuator and configured to grip the stem upwardly so as to upwardly draw or pull the stem, and
   at least one alignment socket on the valve head, the at least one alignment socket being configured to align the valve head with the actuator, wherein:
   the loose type pneumatic valve further includes a cam clamp groove on an outer circumferential surface of the valve head, and
   the actuator further includes a cam clamp rotatably connected to a surface of the actuator, the cam clamp being rotatable around a horizontal axis and elastically biased toward a central portion of the actuator body and selectively insertable into the cam clamp groove.

2. The loose type pneumatic valve as claimed in claim 1, wherein:
   the at least one alignment socket includes a plurality of alignment sockets on a surface of the valve head,
   the plurality of alignment sockets is oriented toward the actuator that is coupleable with the valve head, and
   the alignment sockets of the plurality of alignment sockets are spaced apart from each other by a uniform gap.

3. The loose type pneumatic valve as claimed in claim 1, further comprising at least one resilient position-fixing pin on the valve head,
   wherein:
   the at least one resilient position-fixing pin is oriented toward the actuator that is couplable with the valve head, and
   the at least one resilient position-fixing pin is configured to fix a position of the valve head with respect to the actuator that is couplable with the valve head.

4. The loose type pneumatic valve as claimed in claim 3, wherein:
   the at least one resilient position-fixing pin includes a plurality of resilient position-fixing pins on a surface of the valve head,
   the plurality of resilient position-fixing pins is oriented toward the actuator that is couplable with the valve head, and
   the resilient position-fixing pins of the plurality of resilient position-fixing pins are spaced apart from each other by a uniform gap.

5. The loose type pneumatic valve module as claimed in claim 1, wherein:
   the at least one alignment socket includes a plurality of alignment sockets on a surface of the valve head, which is oriented toward the actuator, the alignment sockets of the plurality of alignment sockets being spaced apart from each other by a uniform gap, and
   the at least one alignment socket pin includes a plurality of alignment socket pins on a surface of the actuator body, which is oriented toward the valve head, the alignment socket pins of the plurality of alignment socket pins being spaced apart from each other by the uniform gap and aligned with the plurality of alignment sockets.

6. The loose type pneumatic valve module as claimed in claim 1, wherein:
   the loose type pneumatic valve further includes at least one resilient position-fixing pin on the valve head and extending toward the actuator, the at least one resilient position-fixing pin being configured to fix a position of the valve head with respect to the actuator, and
   the actuator includes at least one position-fixing groove configured to selectively receive the at least one resilient position-fixing pin.

7. The loose type pneumatic valve module as claimed in claim 1, wherein:
   the at least one resilient position-fixing pin includes a plurality of resilient position-fixing pins on a surface of the valve head, which is oriented toward the actuator, the resilient position-fixing pins of the plurality of resilient position-fixing pins being spaced apart from each other by a uniform gap, and
   the at least one position-fixing groove includes a plurality of position-fixing grooves on a surface of the actuator body, which is oriented toward the valve head, the position-fixing grooves of the plurality of position-fixing grooves being spaced apart from each other by the uniform gap and aligned with the plurality of resilient position-fixing pins.

* * * * *